(12) United States Patent
Sadahiro

(10) Patent No.: US 6,972,751 B2
(45) Date of Patent: Dec. 6, 2005

(54) LID-MOUNTED MONITOR

(75) Inventor: Takashi Sadahiro, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/819,949

(22) Filed: Apr. 8, 2004

(65) Prior Publication Data

US 2004/0201578 A1    Oct. 14, 2004

(30) Foreign Application Priority Data

Apr. 11, 2003  (JP) .............................. 2003-108113

(51) Int. Cl.⁷ ............................................. G09G 5/00
(52) U.S. Cl. ..................................................... 345/173
(58) Field of Search ............................... 361/679, 680, 361/681, 686, 724–727; 345/174

(56) References Cited

U.S. PATENT DOCUMENTS

| | | | | |
|---|---|---|---|---|
| 5,668,612 A | * | 9/1997 | Hung | 348/818 |
| 5,726,868 A | * | 3/1998 | Koyama et al. | 361/832 |
| 5,881,299 A | * | 3/1999 | Nomura et al. | 713/324 |
| 5,892,996 A | * | 4/1999 | Yokota | 396/349 |
| 5,990,874 A | * | 11/1999 | Tsumura et al. | 345/173 |
| 6,003,052 A | * | 12/1999 | Yamagata | 708/100 |
| 6,122,162 A | * | 9/2000 | Horie et al. | 361/683 |
| 2002/0058529 A1 | * | 5/2002 | Horie et al. | 455/556 |
| 2003/0160754 A1 | * | 8/2003 | Hanson et al. | 345/156 |

FOREIGN PATENT DOCUMENTS

| | | |
|---|---|---|
| JP | 06-019849 A | 1/1994 |
| JP | 09-258896 A | 10/1997 |
| JP | 10-145469 A | 5/1998 |
| JP | 2001-118369 A | 4/2001 |
| JP | 2002-027055 A | 1/2002 |

* cited by examiner

Primary Examiner—Lynn Feild
Assistant Examiner—Zachary Pape
(74) Attorney, Agent, or Firm—Birch, Stewart, Kolasch & Birch, LLP

(57) ABSTRACT

A lid-mounted monitor includes a touch panel mounted on a screen of a liquid crystal display, for inputting information when touched, a lid mountably and dismountably disposed on the touch panel, the lid including a small window formed therein, by way of which the screen of the display can be partially seen while the lid is mounted to the touch panel, and an operation unit by way of which the touch panel can be touched, a detecting unit for determining whether the lid is mounted or dismounted to or from the touch panel, and a control unit for, when the lid is dismounted from the touch panel, displaying information on the entire screen of the display and accepting information corresponding to positions where the touch panel can be touched, and for, when the lid is mounted to the touch panel, displaying information on a part of the screen of the display corresponding to the small window and accepting information corresponding to positions where the touch panel can be touched.

6 Claims, 8 Drawing Sheets

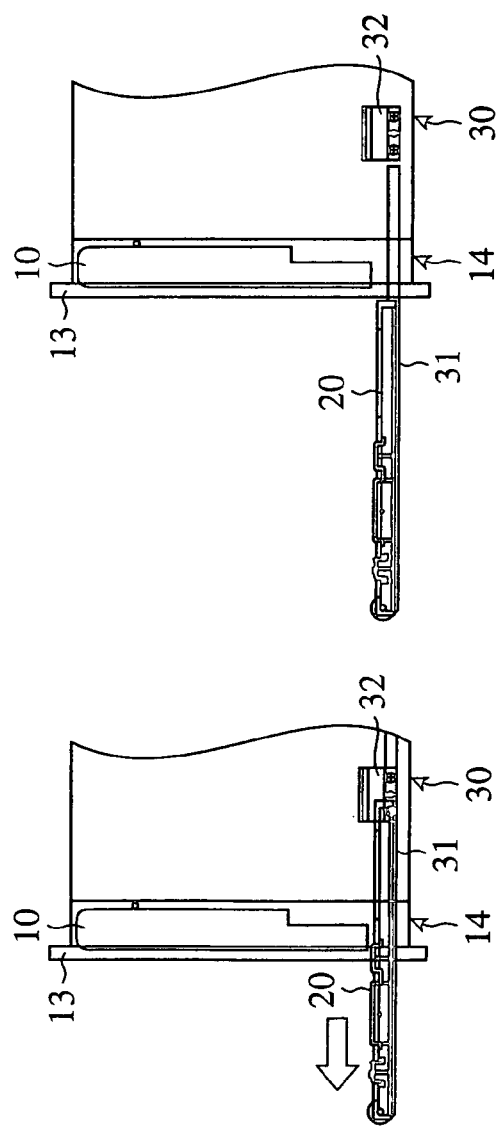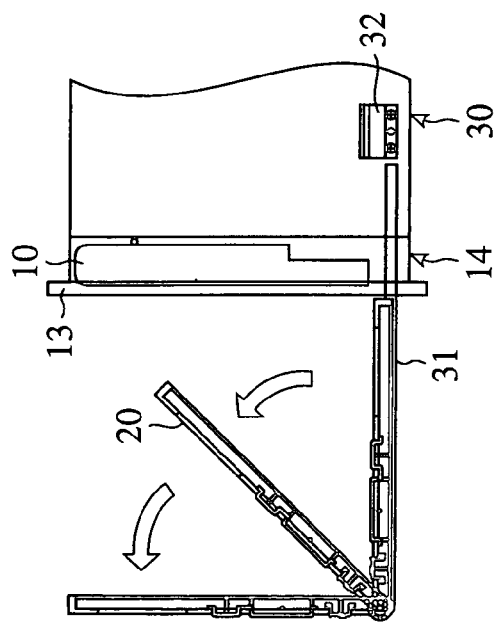

LID-MOUNTED MONITOR

BACKGROUND OF THE INVENTION

1. Field of the Invention

The present invention relates to a lid-mounted monitor that operates differently according to the mounting and demounting of a lid for covering a monitor.

2. Description of Related Art

Conventionally, a car navigation system, a car audio system, and so on are known as equipment mounted in a vehicle (referred to as "vehicle-mounted equipment" from here on). Such vehicle-mounted equipment includes a display unit and an operation unit mounted to a dashboard or the like of a vehicle, for enabling the driver to check a variety of pieces of information and operating conditions of the vehicle, and to carry out an operation, such as changing of settings, while sitting in the driver's seat. However, because the number of pieces of vehicle-mounted equipment that can be installed in the vehicle and the size of each of them are limited by a restriction on space, two or more different types of vehicle-mounted equipment are integrated into one vehicle-mounted equipment and their display units and operation units are unified into one display unit and one operation unit, respectively. In this case, the single operation unit and the single display unit are generally arranged so that the operation unit is placed around the display unit.

On the other hand, as the variety of the functionality of such integrated vehicle-mounted equipment is increased, the amount of information that should be displayed on the screen of a single display unit is increased, and an upsizing of the screen of the display unit, an improvement in the definition of the screen of the display unit, and so on are requested. However, in order to respond to those requests, the space for the operation unit must be decreased. Therefore, measures, such as a downsizing of a plurality of operation buttons included in a single operation unit, and assigning a plurality of functions to each of the plurality of operation buttons, are being taken in order to implement a lot of functions with narrow space. As a result, there cause complicated operations, operating errors, and difficult-to-understand operations.

With this being the situation, from the viewpoint of making the best possible use of an exposed part of vehicle-mounted equipment installed in a dashboard or the like of the vehicle, most vehicle-mounted equipment employs an operating device provided with a touch panel that allows users to directly touch a desired operation button displayed on the screen of a single display unit so as to enable users to perform intuitive operations.

Japanese patent application publication (TOKKAIHEI) No. 9-258896 discloses an information display operating device as such a technology using a touch panel. This information display operating device has a transparent protect cover and a transparent switch operating mechanism, which are disposed in a rotatable operation unit thereof. The information display operating device allows users to see a display of images on the screen of a display unit, and, when the switch operating mechanism is pushed down, detects an input done through the touch switch disposed on the screen of the display unit. The switch operating means is arranged around the screen of the display unit. An opaque member is arranged outside the screen of the display unit, and only a transparent member is arranged on the screen of the display unit. In accordance with this structure, users are allowed to perform switching operations as if they actually operate switches while seeing the screen of the display unit. When the operation unit is placed in an open state, users can perform input operations by using the touch switch. In contrast, when the operation unit is placed in a closed state, users can surely perform switching operations.

Furthermore, Japanese patent application publication (TOKKAIHEI) No. 10-145469 discloses a mobile phone that can perform a sending and receiving operation and provide sending and receiving information associated with the sending and receiving operation for user's checking even when an opening and closing lid is placed in a closed state, and that even when the mobile phone has other functions as well as the telephone function of performing sending and receiving operations, provides excellent ease of operation for proper use of the telephone function or either one of the other functions. In this mobile phone, the opening and closing lid that is opened or closed in order to expose or cover a display unit is mounted to a main body provided with a touch panel and the display unit. A visual check window via which users can visually check a part of the screen of the display unit and a lid-mounted operation unit via which users are allowed to cause the mobile phone to perform sending and receiving operations are disposed in the opening and closing lid. The mobile phone further includes a function switching mechanism for enabling the telephone function of performing a sending and receiving operation by using the lid-mounted operation unit, and displaying sending and receiving information about a telephone number and so on, which is associated with the sending and receiving operation, on a region of the screen of the display unit which faces the visual check window, when the opening and closing lid is closed, and for enabling the telephone function and the other functions when the opening and closing lid is open.

A problem with the prior art operating device using a touch panel is however that when a driver who is driving a vehicle in which the prior art operating device is mounted wants to acquire desired information, for example, the driver has to switch between display screens by operating an operation button so as to find out desired information by looking straight at the screen of a display unit on which various pieces of information are displayed, and it is therefore very dangerous for the driver to operate the operating device while driving the vehicle.

SUMMARY OF THE INVENTION

The present invention is proposed to solve the above-mentioned problems, and it is therefore an object of the present invention to provide a lid-mounted monitor which users are allowed to operate by roughly and visually checking the lid-mounted monitor and based on the sense of touch as well as to perform basic operations by visual checking the lid-mounted monitor.

In accordance with the present invention, there is provided a lid-mounted monitor including: a touch panel mounted on a screen of a display unit, for inputting information when touched; a lid mountably and dismountably disposed on a surface of the touch panel, the lid including a small window formed therein, by way of which the screen of the display unit can be partially seen while the lid is mounted to the surface of the touch panel, and an operation unit by way of which the touch panel can be touched; a detecting unit for determining whether the lid is mounted or dismounted to or from the surface of the touch panel; and a control unit for, when the detecting unit determines that the lid is dismounted from the surface of the touch panel, displaying information on the entire screen of the display unit and accepting information corresponding to positions where the touch panel can be touched, and for, when the detecting unit determines that the lid is mounted to the surface of the touch panel, displaying information on a part of the screen of the display unit corresponding to the small window and accepting information corresponding to positions where the touch panel can be touched.

Therefore, when the lid is mounted to the surface of the touch panel, users can operate each of a plurality of operation buttons that can be disposed in the lid by seeing rough information displayed on the part of the screen of the display unit corresponding to the small window and using the sense of touch. On the other hand, when the lid is dismounted from the surface of the touch panel, users can perform minute operations with reference to various pieces of information displayed on the entire screen of the display.

Further objects and advantages of the present invention will be apparent from the following description of the preferred embodiment of the invention as illustrated in the accompanying drawings.

BRIEF DESCRIPTION OF THE DRAWINGS

FIGS. 5a to 5d are diagrams for explaining the structure and operation of a driving mechanism of the lid-mounted monitor in accordance with embodiment 1 of the present invention;

DETAILED DESCRIPTION OF THE PREFERRED EMBODIMENT

Figure 1A:
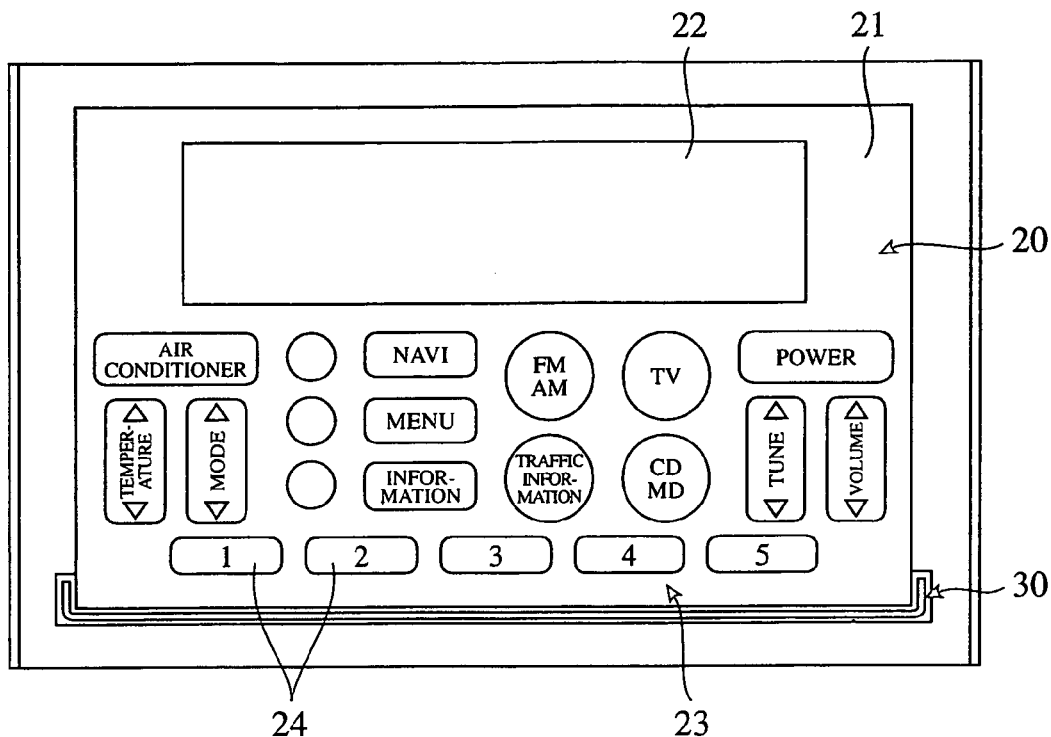
FIGS. 1a and 1b are diagrams showing the structure of a lid-mounted monitor in accordance with embodiment 1 of the present invention.

The preferred embodiment of the invention will now be described with reference to the accompanying drawings. In the following, the preferred embodiment will be explained by taking a case where a lid-mounted monitor in accordance with the present invention is applied to vehicle-mounted equipment as an example. In the preferred embodiment and variants of the embodiment as explained below, the same components or like components are designated by the same reference numerals.

Embodiment 1.

Figure 1B:
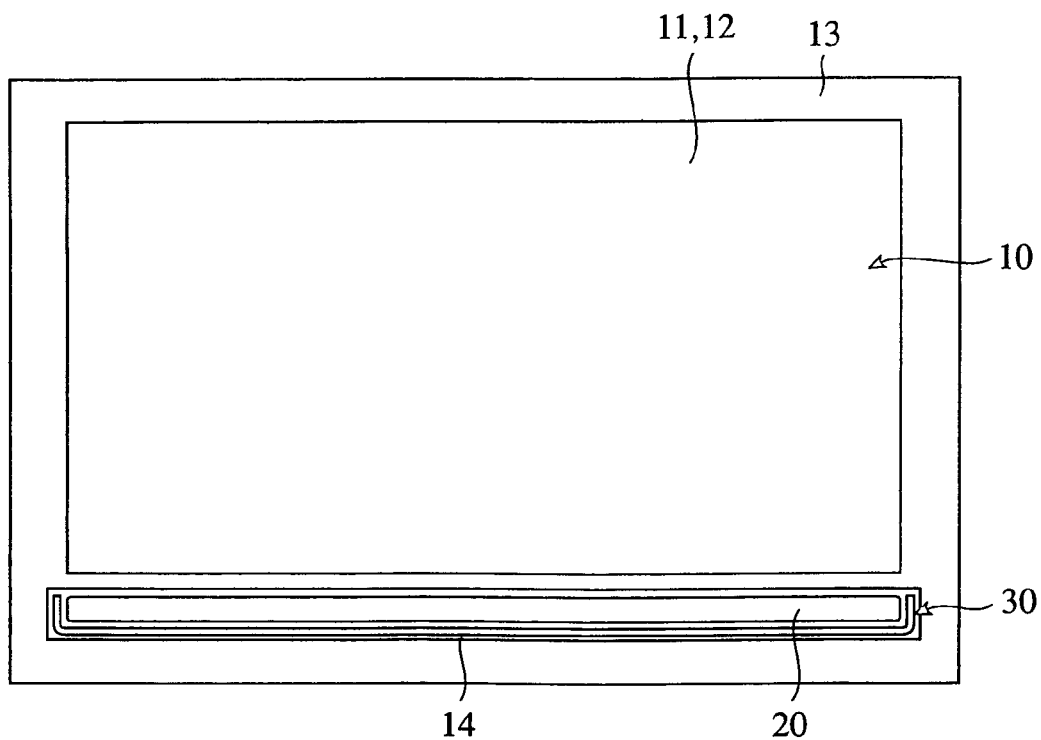

FIGS. 1a and 1b are diagrams showing the structure of a lid-mounted monitor in accordance with embodiment 1 of the present invention. FIG. 1a is a front view showing a state in which a lid is mounted to a display unit of a monitor, and FIG. 1b is a front view showing a state in which the lid is dismounted from the display unit. This lid-mounted monitor is roughly comprised of the display unit 10, the lid 20, and a driving mechanism 30.

The display unit 10 is provided with a liquid crystal display 11 and a transparent touch panel 12 mounted on the screen of the liquid crystal display 11. A color liquid crystal display is used as the liquid crystal display 11, for example, and a touch panel of resistive thin film type is used as the touch panel 12, for example. A backlight 11a not shown in the figure (see FIG. 6) is mounted on a rear face of the liquid crystal display 11. The display unit 10 is supported by a frame 13 that constitutes a part of a housing of the lid-mounted monitor. The display unit 10 displays information that differs according to whether or not the lid 20 is mounted to the display unit of the vehicle-mounted equipment.

The lid 20 can be mounted to or dismounted from a front surface of the display unit 10. When the lid 20 is dismounted from the display unit 10, the lid 20 is accommodated in an accommodating unit 14 horizontally disposed in a lower portion of the frame 13. The entire screen of the display unit 10 is exposed as shown in FIG. 1b when the lid 20 is accommodated in the accommodating unit 14.

Figure 2:
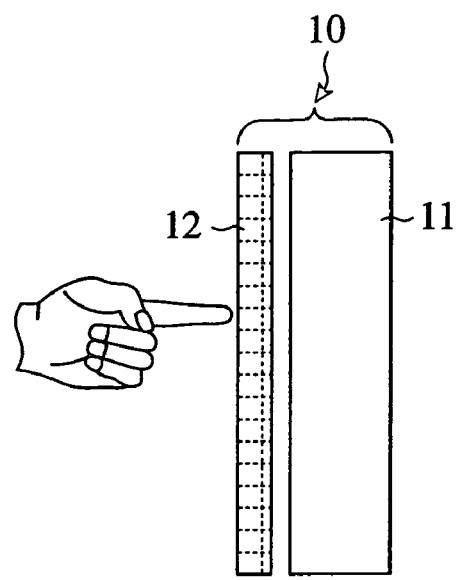
FIG. 2 is a diagram for explaining input operations performed by users when a lid is dismounted from the lid-mounted monitor in accordance with embodiment 1 of the present invention.

When the lid 20 is dismounted from the display unit 10, a variety of pieces of information, such as an image of a map and a route, which is used for navigation, a TV video image, a control screen used for controlling audio equipment, a control screen used for controlling an air conditioner, information indicating traveling conditions and a status of the vehicle (e.g., distance traveled, travel time, average vehicle speed, average fuel cost, maintenance notification, and so on), and environmental information (e.g., the direction in which the vehicle is headed, ambient temperature, atmospheric pressure, altitude, and so on), are selectively displayed on the screen of the display unit 10. Furthermore, pictures (i.e., soft keys) showing buttons which a user can touch in order to input various pieces of information are displayed on the screen of the display unit 10. The user can perform an input operation by touching a picture of a button displayed on the screen of the display unit, as simply shown in FIG. 2.

On the other hand, when the lid 20 is mounted to the front surface of the display unit 10, the lid 20 is drawn out from the accommodating unit 14 and is mounted to the front surface of the display unit 10 so that all of the front surface of the display unit 10 is covered by the lid 20, as shown in FIG. 1a. Simple information is displayed on a part (i.e., a part corresponding to a small window 22 described later) of the screen of the display unit 10 with the lid 20 mounted to the front surface of the display unit.

The lid 20 is provided with the small window 22 and an operation unit 23. The small window 22 is an opening that is so disposed as to penetrate through a main body 21 of the lid 20. The user can see information displayed on the above-mentioned part of the screen of the display unit 10 by way of the small window 22. For example, information which the user can see by way of the small window 22 includes minimum information which the user should check while driving the vehicle, such as navigation information simply displayed on the screen, information about operating conditions of the audio equipment, and information about operating conditions of the air conditioner. The displayed information which the user can see by way of the small window 22 can be changed according to the user's operation. The number of small windows 22 formed in the lid 20 is not limited to one. A plurality of small windows corresponding to plural different pieces of information can be formed in the lid 20.

Figure 3A:
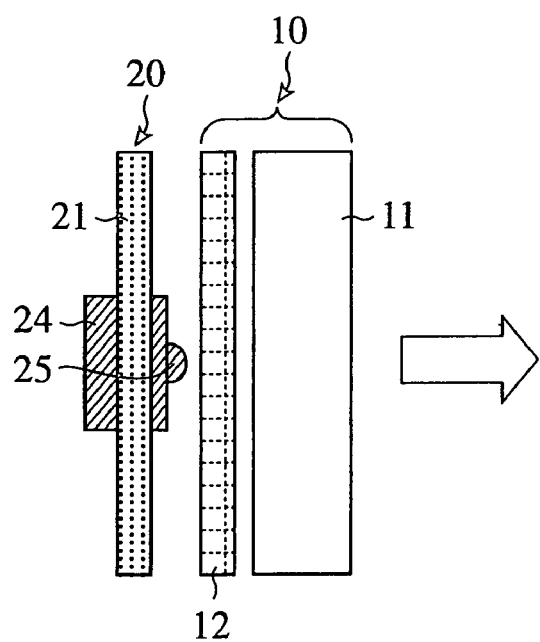
FIGS. 3a and 3b are diagrams for explaining input operations performed by users when the lid provided with operation buttons is mounted to the lid-mounted monitor in accordance with embodiment 1 of the present invention.
Figure 3B:
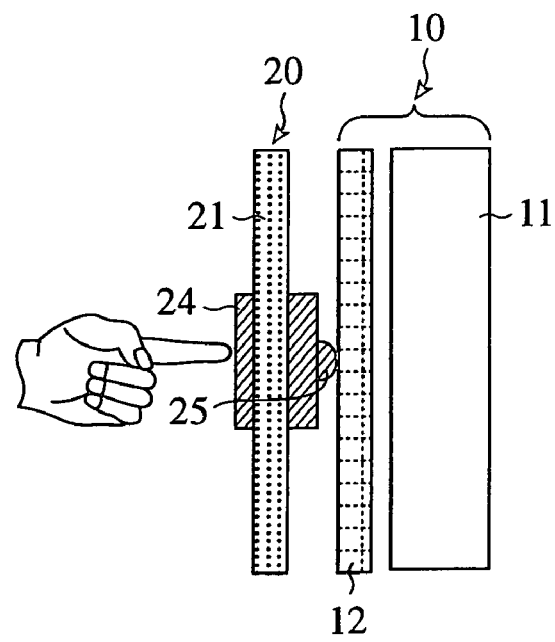

The operation unit 23 is provided with a plurality of mechanical operation buttons (i.e., hard keys), which are representatively designated by reference numeral 24. Each operation button 24, as simply shown in FIGS. 3a and 3b, includes a projecting portion 25 disposed on a rear surface thereof, for example. Each operation button 24 is pushed toward a front surface of the lid 20 by a spring not shown in the figure. Under normal operating conditions, the projecting portion 25 of each operation button 24 is placed away from the touch panel 12 of the display unit 10, as shown in FIG. 3a. When the user pushes down the projecting portion 25 of an operation button 24, the projecting portion 25 is brought into contact with the touch panel 12, as shown in FIG. 3b. Therefore, the user can perform an input operation by pushing down each of the plurality of operation buttons 24 disposed in the operation unit 23.

The plurality of operation buttons 24 disposed in the operation unit 23 can include a power supply button "POWER", a navigation start button "NAVI", a menu selection button "Menu", an information selection button "Information", a radio on/off button "AM/FM", a television on/off button "TV", an audio on/off button "CD/MD", a tuning button "TUNE", a volume control button "Volume", an air conditioner on/off button "Air conditioner", an air conditioner temperature setting button "Temperature", an air conditioner operation mode setting button "Mode", and function buttons "1" to "5", and so on, for example. Each of the plurality of operation buttons 24 is made of an optically transparent material. Furthermore, a function name indicating a function is marked on each of the plurality of operation buttons 24. Then, when a switch used for switching on a light is turned on, the luminance of parts of the liquid crystal display 11 that constitutes the display unit 10, which face the plurality of operation buttons 24, respectively, is increased. As a result, the user can easily and visually check the functionality of each of the plurality of operation buttons 24 disposed in the operation unit 23 even at nighttime. Because this structure eliminates the necessity for using a lamp or LED for illuminating at nighttime, the cost reduction of the lid-mounted monitor can be implemented.

As an alternative, each of the plurality of operation buttons 24 can be made of an optically transparent material, and the liquid crystal display 11 that constitutes the display unit 10 can be so controlled as to display a function name in a desired color and on a part of the screen which faces each of the plurality of operation buttons 24. This structure eliminates the necessity for forming a mark on each of the plurality of operation buttons 24. In accordance with this variant, the user is allowed to assign a desired function to each of the plurality of operation buttons 24 and to cause the liquid crystal display 11 to display a desired function name in a desired color and on a part of the screen corresponding to each of the plurality of operation buttons 24. In addition, a control unit (not shown) of the vehicle-mounted equipment can store information indicating a correspondence between the plurality of operation buttons 24 and a plurality of assigned functions in a memory (not shown). In this case, the control unit can read the information from the memory to assign the plurality of desired functions to the plurality of operation buttons 24 by one operation, respectively. Furthermore, in accordance with this variant, because a plurality of users can configure the operation unit 23 so that the operation unit 23 has an arrangement of the plurality of operation buttons 24 which is suitable for their needs, the lid-mounted monitor can answer users' various needs with a smaller component count.

Figure 4A:
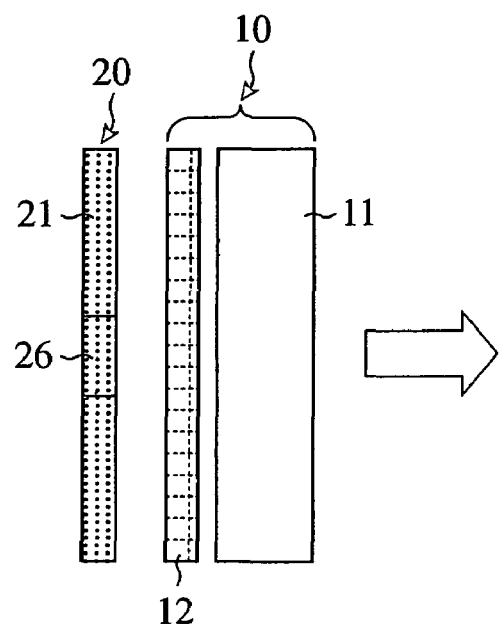
FIGS. 4a and 4b are diagrams for explaining input operations performed by users when the lid provided with small windows is mounted to the lid-mounted monitor in accordance with embodiment 1 of the present invention.
Figure 4B:
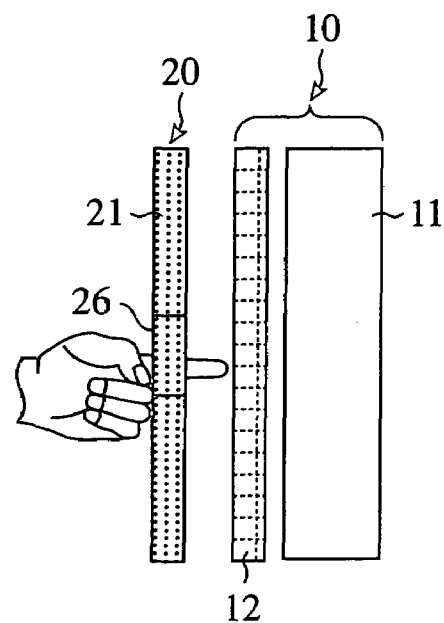

In accordance with another variant of the present embodiment, instead of the plurality of operation buttons 24, the operation unit 23 of the lid 20 can have a plurality of openings 26 formed at positions where the plurality of operation buttons are to be arranged, as simply shown in FIG. 4a. The user can perform an input operation by inserting his or her finger into each of the plurality of openings 26 and touching a corresponding part of the touch panel 12. Because this structure eliminates the necessity for providing the plurality of operation buttons 24, the lid 20 can be manufactured at a low cost.

Next, automatic correction of information acquired from the touch panel 12 and detection of two or more parts of the touch panel 12 that are touched at the same time by the user will be explained. When a touch switch of resistive thin film type is used as the touch panel 12, because coordinates information acquired based on the characteristics of the touch switch may vary, it is necessary to make a correction to the acquired coordinates information. However, when the lid 20 that is constructed as mentioned above is mounted to the display unit disposed in the vehicle-mounted equipment, because positions of the touch panel 12 which the user pushes down by using the plurality of operation buttons 24 or openings 26 are already known, when the user pushes down a position of the touch panel 12, it is possible to detect the amount of variations in the coordinates of the position and to automatically make a correction to the characteristics of the touch switch based on this detection result.

Furthermore, in the touch switch of resistive thin film type, when two or more positions of the touch panel are pushed down at the same time by the user, because the touch panel outputs the coordinates information about a position intermediate between the two or more pushed-down positions, it is impossible to detect the two or more positions that are simultaneously pushed down by the user. Then, in the lid 20 that is constructed as mentioned above, it is preferable that the plurality of operation buttons 24 or openings 26 disposed in the operation unit 23 are so arranged that each of them is not placed at a position corresponding to a position of said touch panel that is assumed to be pushed down when two or more positions are actually pushed down at the same time by the user (i.e., a position intermediate between the two or more positions) Thereby, the above-mentioned problem can be solved.

Basic operation buttons included in the plurality of operation buttons 24 installed in the lid 20, which the user frequently uses, such as an operation button for switching among the navigation function, the television function and the audio function, can be installed in a part of the frame 13. In accordance with this variant, the user is allowed to perform basic operations, such as switching among the navigation function, the television function and the audio function, by using an operation button disposed in the frame 13, and, when the user selects the navigation function, for example, the user is allowed to perform minute operations such as setting of a destination and via points by using the entire screen of the display unit 10. Thus the usability of the lid-mounted monitor can be enhanced.

The driving mechanism 30 can be provided with a motor 32 disposed as a driving source, for sliding a supporting member 31 along a guide not shown in the figure, the supporting member 31 supporting the lid 20 so that the lid 20 can pivot at an end thereof, and for causing the lid 20 to pivot, as shown in FIGS. 5a to 5d. The driving mechanism 30 can draw out the lid 20 from the accommodating unit 14 and then mount the lid 20 to the front surface of the display unit 10. The driving mechanism 30 can also dismount the lid 20 from the front surface of the display unit 10 and then accommodate the lid 20 in the accommodating unit 14.

Next, the process of mounting the lid 20 to the front surface of the display unit 10 which is performed by the driving mechanism 30 will be explained with reference to FIG. 5a to FIG. 5d. When a display control unit 50 described later drives the motor 32 by way of a motor driving unit 54 described later, the lid 20 folded on the supporting member 31 is made to slide, as shown in FIG. 5a, in a direction of an arrow shown in the figure so that the lid 20 is drawn out from the accommodating unit 14 along a guide not shown in the figure.

Then, as shown in FIG. 5b, a pivoting mechanism not shown in the figure operates when the lid 20 is placed in a state in which the whole of the lid 20 is drawn out to the outside of the lid-mounted monitor, and the lid 20 pivots about the end portion of the supporting member 31, as shown in FIG. 5c, in an upward direction (i.e., a direction of arrows shown in the figure). When the lid 20 then enters a state in which the lid 20 stands in an upright position with respect to the supporting member 31, as shown in FIG. 5d, the supporting member 31 is made to slide along the guide not shown in the figure in a direction of an arrow shown in the figure until accommodated in the accommodating unit 14. The driving of the supporting member by the driving mechanism 30 is stopped when the lid 20 is brought into contact with the front surface of the display unit 10, and the lid 20 is then mounted to the front surface of the display unit 10. When the lid 20 is dismounted from the front surface of the display unit 10 and is then accommodated in the accommodating unit 14, the driving mechanism performs operations opposite to the operations mentioned above which are performed when mounting the lid 20 to the front surface of the display unit 10.

Figure 6:
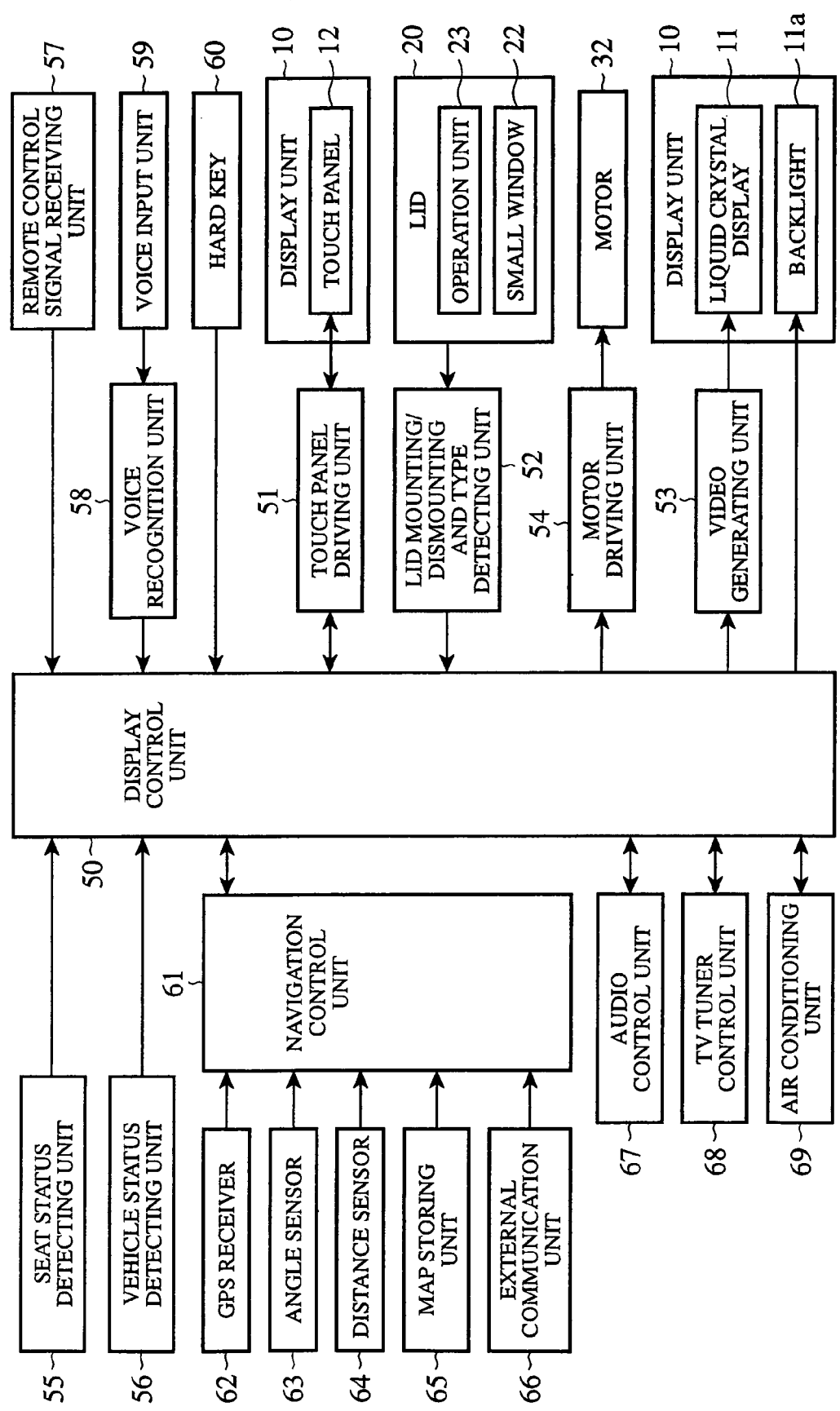
FIG. 6 is a block diagram showing the electrical structure of vehicle-mounted equipment to which the lid-mounted monitor in accordance with embodiment 1 of the present invention is applied.

FIG. 6 is a block diagram showing the electrical structure of the vehicle-mounted equipment to which the lid-mounted monitor in accordance with embodiment 1 of the present invention is applied. This vehicle-mounted equipment is provided with a display control unit 50, a touch panel driving unit 51, a lid mounting/dismounting and lid type detecting unit 52, a video generating unit 53, a motor driving unit 54, a seat status detecting unit 55, a vehicle status detecting unit 56, a remote control signal receiving unit 57, a voice recognition unit 58, a voice input unit 59, a hard key 60, a navigation control unit 61, a GPS receiver 62, an angle sensor 63, a distance sensor 64, a map storing unit 65, an external communication unit 66, an audio control unit 67, a TV tuner control unit 68, and an air conditioning unit 69.

The display control unit 50 consists of, for example, a microcomputer, and controls the whole of this vehicle-mounted equipment. The above-mentioned touch panel 12 is connected with the touch panel driving unit 51. The touch panel driving unit 51 detects the coordinates of a position of the touch panel 12 which the user touches based on a signal sent from the touch panel 12, and sends information about the position coordinates to the display control unit 50.

The lid mounting/dismounting and lid type detecting unit 52 detects both the presence or absence of the lid 20 on the front surface of the display unit 10 and the type of the lid 20. As the lidmounting/dismounting and lid type detecting unit 52, such a sensor as a mechanical switch that is pushed down when the lid 20 is mounted to the display unit 10, a light sensor, or a pressure sensor, a communication device for detecting the presence or absence of the lid 20 by communicating with the lid 20, or a barcode reading device for reading a bar code stuck to the lid 20 can be used, for example. A signal indicating the presence or absence of the lid 20 and the type of the lid 20 detected by the lid mounting/dismounting and lid type detecting unit 52 is sent, as opening and closing detection information, to the display control unit 50.

The video generating unit 53 generates a video signal used for displaying an image on the screen of the liquid crystal display 11 based on the signal sent thereto from the display control unit 50. This video signal includes a signal used for generating an image of a map and the searched-for route used for navigation, a TV video image, an image for control of audio, an image for control of the air conditioning unit, or an image of a message indicating a traveling status and conditions of the vehicle. The video signal generated by the image generating unit 53 is sent to the liquid crystal display 11. Lighting and turning off of the backlight 11a placed behind the liquid crystal display 11 are controlled directly by a signal sent from the display control unit 50.

The motor driving unit 54 generates a driving signal used for driving the motor 32 that constitutes the driving mechanism 30 according to a signal sent thereto from the display control unit 50. When the driving signal generated by the motor driving unit 54 is supplied to the motor 32, the motor 32 normally or reversely rotates. As a result, the driving mechanism 30 mounts the lid 20 to the front surface of the display unit 10 or dismounts the lid 20 from the front surface of the display unit 10.

The seat status detecting unit 55 detects whether or not a person is sitting in a seat of the vehicle. The seat status detecting unit 55 then sends this detection result to the display control unit 50 as seat status information. The vehicle status detecting unit 56 detects whether the vehicle is traveling or stationary. The vehicle status detecting unit 56 then sends this detection result to the display control unit 50 as vehicle status information.

The remote control signal receiving unit 57 receives an optical signal or an electric wave from a remote control unit not shown in the figure, and converts it into an electrical signal and sends it to the display control unit 50. Users are allowed to use the not-shown remote control unit to operate the vehicle-mounted equipment from remote locations without touching the touch panel 12 disposed in the display unit 10 and operating any operation button 24 installed in the lid 20.

The voice recognition unit 58 recognizes a sound signal sent thereto from the voice input unit 59 which consists of a microphone, for example, and sends a recognition result to the display control unit 50. Users are allowed to use the voice recognition unit 58 and the voice input unit 59 in order to operate the vehicle-mounted equipment by voice.

The hard key 60 can be comprised of a plurality of mechanical switches. The hard key 60 includes a monitor power supply switch (not shown in the figure) for supplying a power supply to the display unit 10 (i.e., the liquid crystal display 11, the backlight 11*a*, and the touch panel 12), and an automatic opening/closing activating switch (not shown in the figure) for generating a signal indicating an instruction for automatically mounting or dismounting the lid 20 to or from the display unit.

The GPS receiver 62, the angle sensor 63, the distance sensor 64, the map storing unit 65, and the external communication unit 66 are connected to the navigation control unit 61. The GPS receiver calculates the current position of the vehicle based on electric waves from GPS satellites, and sends information about the current position of the vehicle to the navigation control unit 61. The angle sensor 63 detects the direction in which the vehicle is headed, and sends information about the heading of the vehicle to the navigation control unit 61. The distance sensor 64 detects the distance traveled by the vehicle every unit time, and sends information about the distance traveled by the vehicle to the navigation control unit 61. The map storing unit 65 stores map information. Map information stored in the map storing unit 65 is read by the navigation control unit 61. The external communication unit 66 acquires road information, for example, by communicating with a traffic information center not shown in the figure.

The navigation control unit 61 searches for a route to a destination or a via point which the user specifies by operating either soft keys displayed on the screen of the display unit 10 or operation buttons 24 disposed in the lid 20, and then performs a process of guiding the vehicle along the searched-for route. Concretely, the navigation control unit 61 reads map information about a map of a region in which the vehicle is traveling from the map storing unit 65, and sends the map information to the display control unit 50. The display control unit 50 sends the received map information to the video generating unit 53. The video generating unit 53 generates a video signal based on the received map information, and sends the video signal to the display unit 10. As a result, the map is displayed on the screen of the display unit 10.

The navigation control unit 61 further calculates the current position of the vehicle based on signals sent thereto from the GPS receiver 62, the angle sensor 63, and the distance sensor 64, and then displays a mark indicating the current position of the vehicle on the map displayed on the screen of the display unit 10 according to a procedure similar to the above-mentioned procedure. In addition, the navigation control unit 61 displays road information received from the external communication unit 66 on the screen of the display unit 10 according to a procedure similar to the above-mentioned procedure.

The audio control unit 67 reproduces a sound according to the user's operations of either soft keys displayed on the screen of the display unit 10 or operation buttons 24 disposed in the lid 20. The TV tuner control unit 68 selects a channel according to the user's operations of either soft keys displayed on the screen of the display unit 10 or operation buttons 24 disposed in the lid 20, and displays an image associated with the selected channel on the screen of the display unit 10 according to a procedure similar to the above-mentioned procedure. The air conditioning control unit 69 sets a temperature and an operation mode for the air conditioning unit according to the user's operations of either soft keys displayed on the screen of the display unit 10 or operation buttons 24 disposed in the lid 20.

Figure 7:
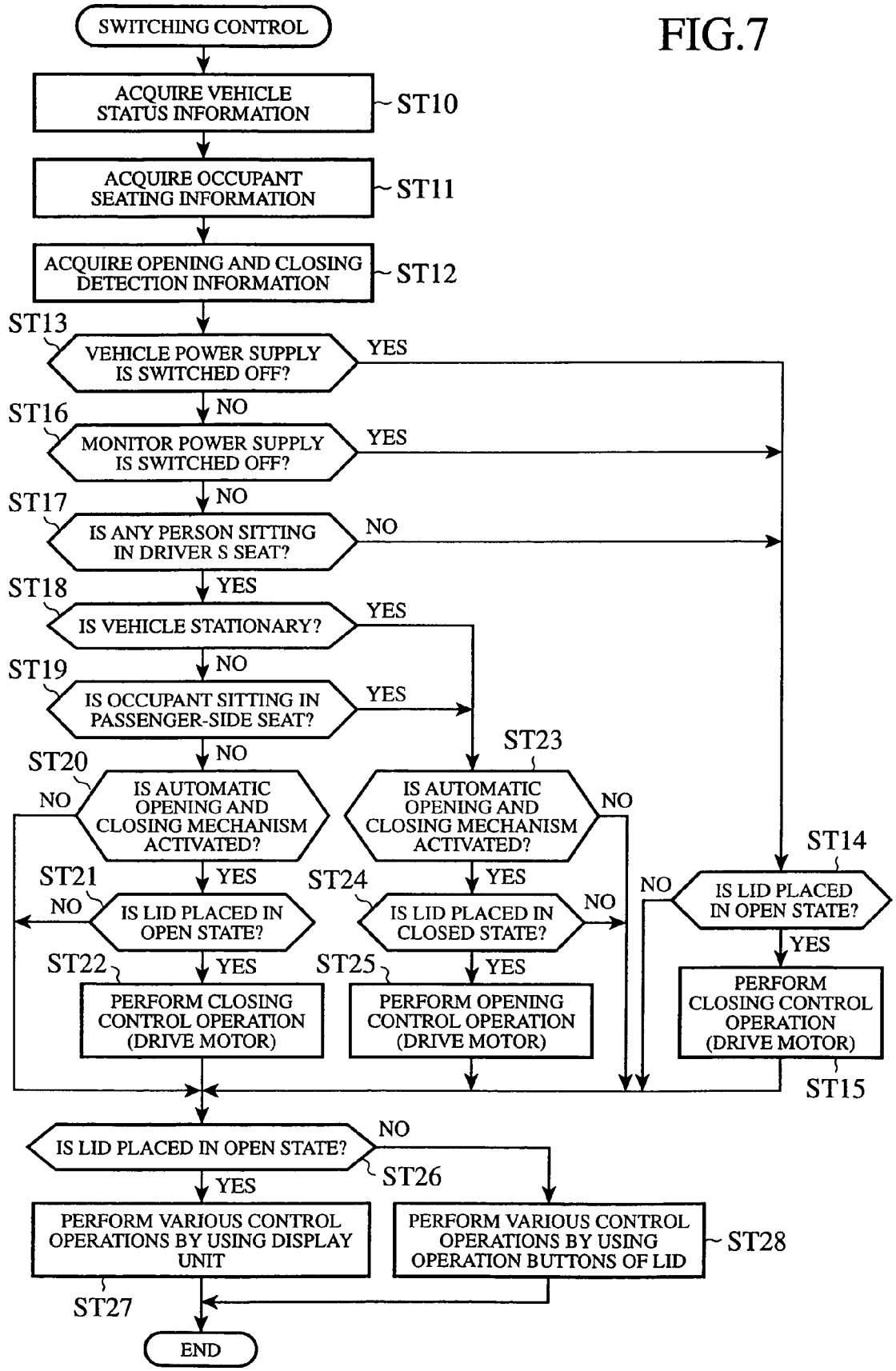
FIG. 7 is a flow chart showing the operation of the vehicle-mounted equipment to which the lid-mounted monitor in accordance with embodiment 1 of the present invention is applied.

Next, a process of controlling opening and closing of the lid 20 among various processes carried by the vehicle-mounted equipment to which the lid-mounted motor in accordance with embodiment 1 of the present invention is applied will be explained with reference to a flow chart shown in FIG. 7. First of all, the vehicle status detecting unit 56 acquires vehicle status information indicating whether the vehicle is traveling or stationary (in step ST10). The seat status detecting unit 55 then acquires occupant seating information indicating whether or not a person is sitting in a seat of the vehicle (in step ST11). The lid mounting/dismounting and lid type detecting unit 52 then acquires opening and closing detection information indicating whether the lid 20 is mounted or dismounted to or from the front surface of the display unit 10 (in step ST12).

Next, the vehicle-mounted equipment checks to see whether or not the power supply of the vehicle is switched off (in step ST13). The vehicle-mounted equipment checks to see whether or not the power supply of the vehicle is switched off by determining whether or not an ignition switch not shown in the figure is placed at an on position. When determining that the power supply of the vehicle is switched off, in step ST13, the vehicle-mounted equipment advances to step ST14 in which it checks to see whether the lid 20 is placed at an open state (i.e., a state in which the lid is dismounted from the display unit) Then, when determining that the lid 20 is placed in the open state, the vehicle-mounted equipment performs a closing control operation as previously explained with reference to FIGS. 5*a* to 5*d* (in step ST15). After that, the vehicle-mounted equipment advances to step ST26. On the other hand, when determining that the lid 20 is not placed in the open state, the vehicle-mounted equipment recognizes that the lid 20 has already been placed in a closed state and then advances to step ST26. According to the above-mentioned procedure, when the power supply of the vehicle is switched off, the lid 20 is always placed in the state in which the lid 20 is mounted to the front surface of the display unit 10.

When determining that the power supply of the vehicle is not switched off in above-mentioned step ST13, the vehicle-mounted equipment then checks to see whether or not the monitor power supply is switched off (in step ST16). At this time, the vehicle-mounted equipment then checks to see whether or not the monitor power supply is switched off by determining whether or not a monitor power supply switch included in the hard key 60 is turned on. The vehicle-mounted equipment then advances to step ST14 in which it performs the above-mentioned process when determining that the monitor power supply is switched off. As a result, when the power supply is not supplied to the liquid crystal display 11, the backlight 11*a*, and the touch panel 12, which constitute the display unit 10, the lid 20 is always placed in the state in which the lid 20 is mounted to the front surface of the display unit 10.

When determining that the monitor power supply is not switched off in above-mentioned step ST16, the vehicle-mounted equipment then refers to the occupant seating information acquired in above-mentioned step ST11 and checks to see whether no occupant is sitting in a seat of the vehicle (in step ST17) When determining that no occupant is sitting in a seat of the vehicle, the vehicle-mounted equipment then advances to step ST14 in which it performs the above-mentioned process. As a result, when no occupant is sitting in a seat of the vehicle, the lid 20 is always placed in the state in which the lid 20 is mounted to the front surface of the display unit 10.

When determining that one or more occupants are sitting in seats of the vehicle in above-mentioned step ST17, the vehicle-mounted equipment checks to see whether or not the vehicle is stationary with reference to the vehicle status information acquired in above-mentioned step ST10 (in step ST18). The vehicle-mounted equipment then advances to step ST23 when determining that the vehicle is stationary. On the other hand, when determining that the vehicle is not stationary, that is, the vehicle is traveling, the vehicle-mounted equipment then checks to see whether or not an occupant is sitting in a passenger-side seat with reference to the occupant seating information acquired in above-mentioned step ST11 (in step ST19). The vehicle-mounted equipment then advances to step ST23 when determining that an occupant is sitting in the passenger-side seat of the vehicle. On the other hand, when determining that no occupant is sitting in the passenger-side seat of the vehicle, the vehicle-mounted equipment checks to see whether or not an automatic opening and closing mechanism for automatically opening and closing the lid is activated (in step ST20). The vehicle-mounted equipment can check to see whether or not the automatic opening and closing mechanism for opening and closing the lid is activated by determining whether or not the automatic opening/closing activating switch is turned on. The vehicle-mounted equipment advances to step ST26 when determining that the automatic opening and closing mechanism for opening and closing the lid is inactivated.

On the other hand, when determining that the automatic opening and closing mechanism is activated in step ST20, the vehicle-mounted equipment then checks to see whether or not the lid 20 is placed in the open state (i.e., the state in which the lid is dismounted from the display unit) (in step ST21). When determining that the lid 20 is placed in the open state, the vehicle-mounted equipment performs a closing control operation as previously explained with reference to FIG. 5 (in step ST22). After that, the vehicle-mounted equipment advances to step ST26. On the other hand, when determining that the lid 20 is not placed in the open state, the vehicle-mounted equipment recognizes that the lid 20 has already been placed in the closed state and then advances to step ST26. In performing above-mentioned steps ST18 to ST22, when the vehicle is traveling and no person is sitting in the passenger-side seat, the vehicle-mounted equipment mounts the lid 20 to the front surface of the display unit 10 on the condition that the automatic opening and closing is activated.

When determining that the vehicle is stationary in above-mentioned step ST18 and then determining that an occupant is sitting in the passenger-side seat in above-mentioned step ST19, the vehicle-mounted equipment checks to see whether or not the automatic opening and closing mechanism is activated (in step ST20). The vehicle-mounted equipment can check to see whether or not the automatic opening and closing mechanism is activated by determining whether or not the automatic opening/closing activating switch is turned on. The vehicle-mounted equipment then advances to step ST26 when determining that the automatic opening and closing mechanism is inactivated. On the other hand, when determining that the automatic opening and closing mechanism is activated, the vehicle-mounted equipment checks to see whether or not the lid 20 is placed in the closed state (i.e., the state in which the lid 20 is mounted to the display unit) (in step ST24). When determining that the lid 20 is placed in the closed state, the vehicle-mounted equipment performs an opening control operation as previously explained with reference to FIG. 5 (in step ST25). After that, the vehicle-mounted equipment advances to step ST26. On the other hand, when determining that the lid 20 is not placed in the closed state, the vehicle-mounted equipment recognizes that the lid 20 has already been placed in the open state and then advances to step ST26. In performing above-mentioned steps ST18, ST19, and ST23 to ST25, when the vehicle is traveling and a person is sitting in the passenger-side seat, the vehicle-mounted equipment dismounts the lid 20 from the front surface of the display unit 10 on the condition that the automatic opening and closing mechanism is activated.

In step ST26, the vehicle-mounted equipment checks to see whether or not the lid 20 is placed in the open state (i.e., the state in which the lid 20 is dismounted from the display unit). When determining that the lid 20 is placed in the open state, the vehicle-mounted equipment performs various control operations by using the display unit 10 (in step ST27). On the other hand, when determining that the lid 20 is not placed in the open state, the vehicle-mounted equipment performs various control operations by using the operation unit 23 disposed in the lid 20 (in step ST28).

As previously explained, in the lid-mounted monitor in accordance with this embodiment 1, when the vehicle is traveling and no occupant is sitting in the passenger-side seat, the lid 20 is mounted to the front surface of the display unit 10. Therefore, because the driver can operate each of the plurality of operation buttons 24 disposed in the lid 20 by seeing rough information displayed in the small window 22 and using the sense of touch, the driver need not look straight at images displayed on the screen of the display unit 10 and each of the plurality of operation buttons 24, and, even if the driver is driving the vehicle, can perform various operations safely. On the other hand, when the vehicle is stationary or an occupant is sitting in the passenger-side seat, the vehicle-mounted equipment dismounts the lid 20 from the front surface of the display unit 10. Therefore, either the driver or an occupant sitting in the passenger-side seat can perform minute operations with reference to various pieces of information displayed on the screen of the display unit 20.

Figure 8A:
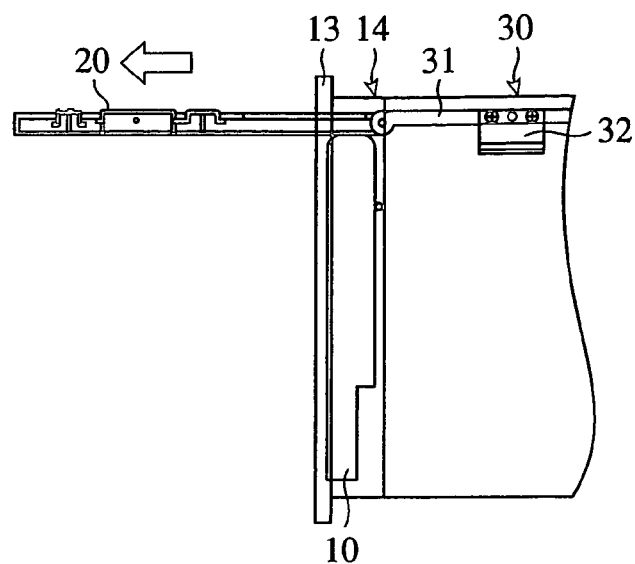
FIGS. 8a to 8c are diagrams for explaining the structure and operation of a driving mechanism of a lid-mounted monitor in accordance with a variant of embodiment 1 of the present invention.
Figure 8B:
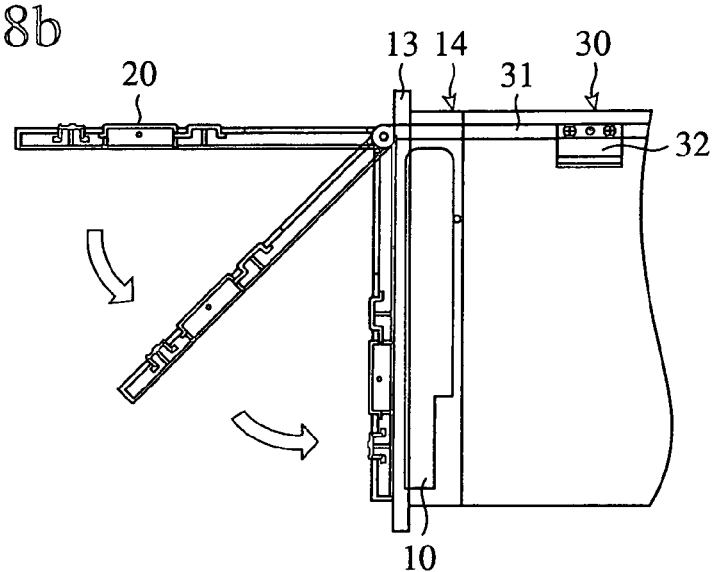
Figure 8C:
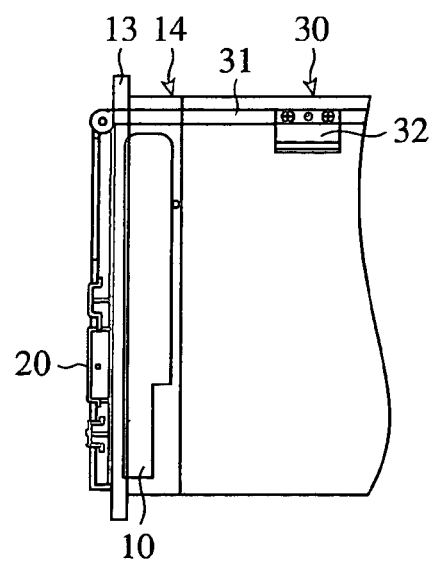

In accordance with embodiment 1, the accommodating unit 14 for accommodating the lid 20 therein is horizontally disposed in a lower portion of the frame 13, as previously mentioned. In a variant of embodiment 1, the accommodating unit 14 for accommodating the lid 20 therein can be horizontally disposed in an upper portion of the frame 13, as shown in FIGS. 8a to 8c. In accordance with this variant, a driving mechanism 30 can be provided with a supporting member 31 for pivotably supporting the lid 20 at an end thereof, and a motor 32 disposed as a driving source, for sliding the supporting member 31 along a guide not shown in the figure and for causing the lid 20 to pivot about the end of the supporting member.

Next, the process of mounting the lid 20 to the front surface of the display unit 10 which is performed by the driving mechanism 30 will be explained with reference to FIG. 8a to FIG. 8c. When the display control unit 50 drives the motor 32 by way of a motor driving unit 54, the lid 20 coupled to the supporting member 31 is made to slide, as shown in FIG. 8a, in a direction of an arrow shown in the figure so that the lid 20 is drawn out from the accommodating unit 14 along the guide not shown in the figure.

Then, as shown in FIG. 8b, a pivoting mechanism not shown in the figure operates when the lid 20 is placed in a state in which the whole of the lid 20 is drawn out to the outside of the lid-mounted monitor, and the lid 20 pivots about the end of the supporting member 31 in an upward direction (i.e., a direction of arrows shown in the figure). When the lid 20 then enters a state in which the lid 20 stands in an upright position with respect to the supporting member 31, as shown in FIG. 8*c*, the driving of the supporting member by the driving mechanism 30 is stopped and the lid 20 is then mounted to the front surface of the display unit 10. In contrast, when the lid 20 is dismounted from the front surface of the display unit 10 and is then accommodated in the accommodating unit 14, the driving mechanism performs operations opposite to the operations mentioned above which are performed when mounting the lid 20 to the front surface of the display unit 10.

In accordance with another variant of the present embodiment, not illustrated, the accommodating unit 14 for accommodating the lid 20 therein can be vertically disposed in a left-side or right-side portion of the frame 13. In this case, the driving mechanism 30 can be constructed like that according to embodiment 1 or an above-mentioned variant of embodiment 1.

Furthermore, in accordance with embodiment 1 mentioned above, based on the seat status information from the seat status detecting unit 55 and the vehicle status information from the vehicle status detecting unit 56, the vehicle-mounted equipment automatically mounts or dismounts the lid 20 to or from the front surface of the display unit 10. As an alternative, the vehicle-mounted equipment can have an opening and closing instructing switch as one hard key 60, and, in response to an instruction provided by way of this opening and closing instructing switch, can automatically mount or dismount the lid 20 to or from the front surface of the display unit 10. Because this structure makes it possible for users to explicitly provide an instruction for mounting or dismounting the lid 20 to or from the front surface of the display unit 10, the usability of the vehicle-mounted equipment can be improved.

In accordance with another variant, instead of automatically mounting or dismounting the lid 20 to or from the front surface of the display unit 10, users are allowed to manually draw out the lid 20 from the accommodating unit 14 and mount the lid 20 to the front surface of the display unit 20, and to manually accommodate the lid 20 in the accommodating unit 14 in order to dismount the lid 20 from the front surface of the display unit 20. Because this structure can eliminate the necessity for providing the motor 32 and the motor driving unit 54, the lid-mounted monitor can be simplified and manufactured at a low cost.

As previously mentioned, in accordance with embodiment 1, the lid-mounted monitor is so constructed as to slide the lid 20 when accommodating the lid 20 in the accommodating unit 14 (this mechanism is referred to as "sliding mechanism" from here on). As an alternative, the lid 20 can be pivotably secured to one side of the frame 13 with a hinge so that the lid 20 can be mounted and dismounted to and from the front surface of the display unit 10 (this mechanism is referred to as "opening and closing mechanism" from here on). Because this structure eliminates the necessity for providing the accommodating unit 14 for accommodating the lid 20 therein, the structure of the housing of the lid-mounted monitor can be simplified. In accordance with this variant, the lid-mounted monitor can automatically perform opening and closing of the lid 20 under the control of the display control unit 50, like that in accordance with embodiment 1 mentioned above.

In accordance with another variant, the lid-mounted monitor is so constructed that users are allowed to mount the lid 20 to the front surface of the display unit 10 by manually attaching the lid 20 to the frame 13, and to dismount the lid 20 from the front surface of the display unit 10 by manually detaching the lid 20 from the frame 13 (this mechanism is referred to as "Manually attaching and detaching mechanism" from here on). The use of this manually attaching and detaching mechanism can further simplify the structure of the lid-mounted monitor as compared with the case of using the above-mentioned sliding mechanism and the case of using the above-mentioned opening and closing mechanism.

Figure 9A:
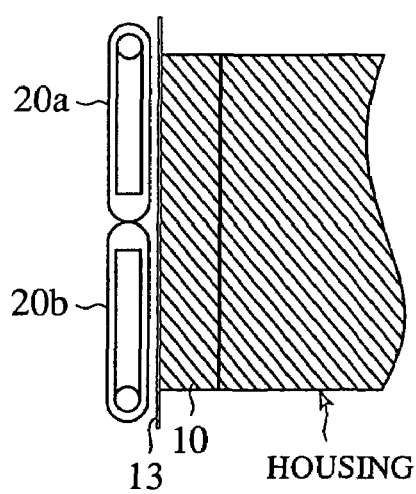
FIGS. 9a and 9b are diagrams for explaining the structure and operation of a lid of a lid-mounted monitor in accordance with another variant of embodiment 1 of the present invention.
Figure 9B:
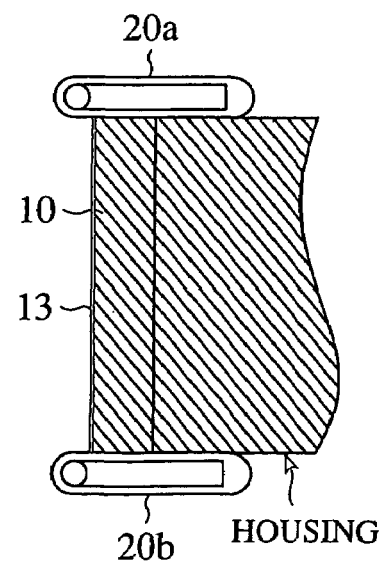

In accordance with embodiment 1 mentioned above, the lid-mounted monitor is so constructed as to cover the entire screen of the display unit 10 with the single lid 20. In accordance with a further variant as simply shown in FIGS. 9*a* and 9*b*, the lid 20 can be divided into an upper lid 20*a* and a lower lid 20*b*, and they can be accommodated in respective accommodating units disposed in upper and lower portions of the housing by using respective sliding mechanisms. FIG. 9*a* shows a state in which both the upper lid 20*a* and the lower lid 20*b* are mounted to the front surface of the display unit 10, and FIG. 9*b* shows a state in which both the upper lid 20*a* and the lower lid 20*b* are dismounted from the front surface of the display unit 10. Even in the case of the structure as shown in FIGS. 9*a* and 9*b*, both the upper lid 20*a* and the lower lid 20*b* can be mounted and dismounted to and from the front surface of the display unit 10 by using opening and closing mechanisms or manually attaching and detaching mechanisms, instead of the sliding mechanisms.

In any one of above-mentioned embodiment 1 and variants of embodiment 1, the lid-mounted monitor is so constructed that either the lid 20 or the upper and lower lids 20*a* and 20*b* cover the entire screen of the display unit 10. In accordance with another variant as simplify shown in FIGS. 10*a* to 10*d*, the lid 20 can be so formed as to have a size required for covering a part of the front surface of the display unit 10, and can be made to vertically slide along the front surface of the display unit 10. In this case, only the operation unit 23 is formed in the lid 20, as shown in FIG. 10*d*, but no small window is formed in the lid 20. Furthermore, the lid 20 can be accommodated in the accommodating unit disposed in the upper portion of the housing by using a sliding mechanism, as shown in FIG. 10*c*.

Figure 10A:
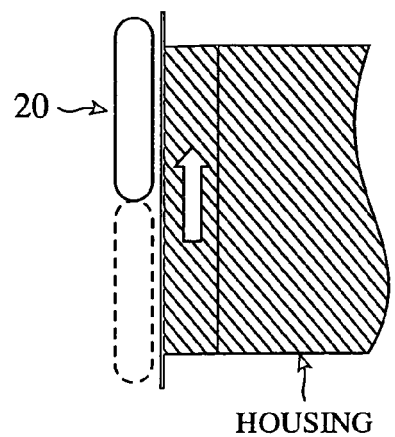
FIGS. 10a and 10d are diagrams for explaining the structure and operation of a lid of a lid-mounted monitor in accordance with a further variant of embodiment 1 of the present invention.
Figure 10B:
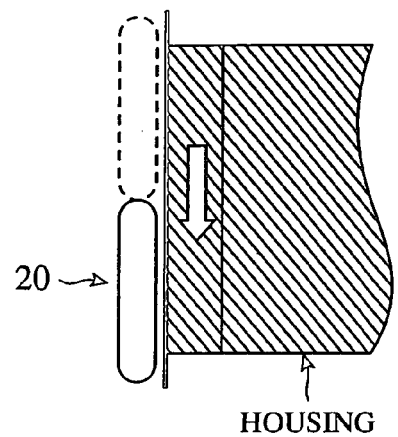
Figure 10C:
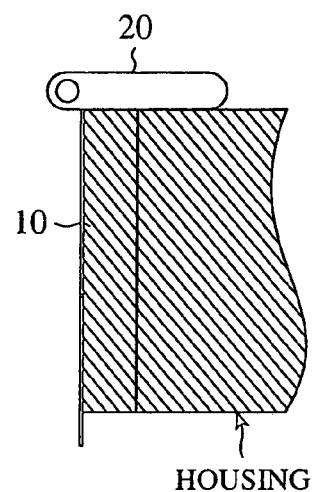
Figure 10D:
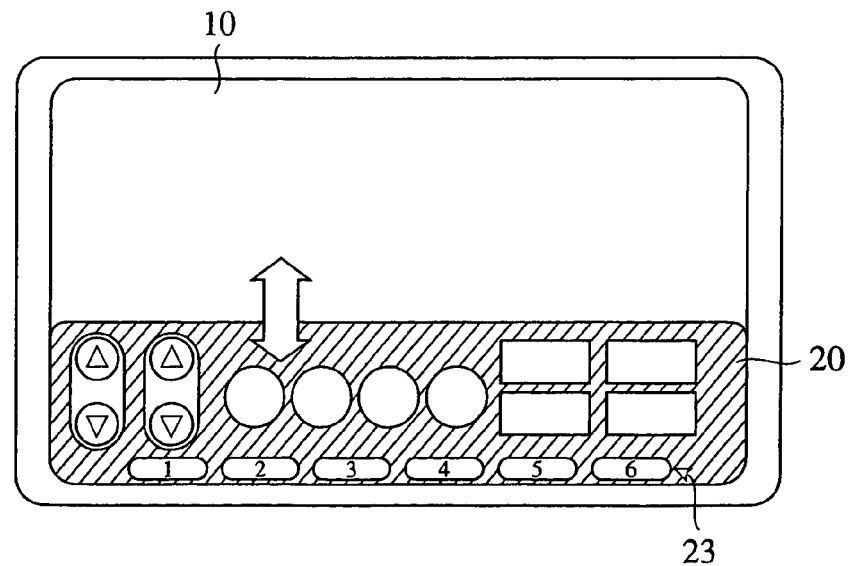

The lid-mounted monitor that is thus constructed can display an image of a map and a route used for navigation on a lower portion of the screen of the display unit 10, for example, when the lid 20 is made to slide until placed in a state as shown in FIG. 10*a*. On the other hand, when the lid 20 is made to slide until placed in another state as shown in FIG. 10*b*, the lid-mounted monitor can display a control screen used for control of the audio equipment and the air conditioning unit on an upper portion of the screen of the display unit 10, for example. In addition, when the lid 20 is accommodated in the accommodating unit, as shown in FIG. 10*c*, the lid-mounted monitor can display a TV video image on the entire screen of the display unit 10.

Even in the case of the structure as shown in FIGS. 10*a* to 10*d*, the lid 20 can be mounted and dismounted to and from the front surface of the display unit 10 by using an opening and closing mechanism or manually attaching and detaching mechanism, instead of the sliding mechanism. In addition, the lid-mounted monitor can be so constructed as to automatically make the lid 20 slide in order to accommodate the lid 20 in the accommodating unit under the control of the display control unit 50, like that of embodiment 1 mentioned above.

In any one of above-mentioned embodiment 1 and variants of embodiment 1, the lid-mounted monitor has only one type of lid 20 or only one type of a pair of upper and lower lids 20a and 20b. The lid-mounted monitor can have two or more types of lids or two or more types of pairs of lids, in each of which a small window 22 of a different size is formed at a different position and a different number of operation units 23 having different sizes are disposed and each of which can be replaced by any one of the other types of lids or the other types of pairs of lids when necessary. In this case, the display control unit 50 can change information displayed on a part of the screen of the display unit 10 corresponding to the small window 22 according to the type of the lid 20 which is detected by the lid mounting/dismounting and lid type detecting unit 52, and can change the definition of information that is input when the user operates the operation unit 23 and the touch panel 12 is touched. This structure makes it possible for each of users who share a single vehicle to comfortably operate the lid-mounted monitor by attaching a type of lid 20 that meets his or her needs to the lid-mounted monitor.

Above-mentioned embodiment 1 and variants of embodiment 1 are explained by taking the case where the lid-mounted monitor in accordance with the present invention is applied to vehicle-mounted equipment as an example. However, applications of the lid-mounted monitor in accordance with the present invention are not limited to vehicle-mounted equipment, and the lid-mounted monitor in accordance with the present invention can be applied to various types of equipment.

Many widely different embodiments of the present invention may be constructed without departing from the spirit and scope of the present invention. It should be understood that the present invention is not limited to the specific embodiments described in the specification, except as defined in the appended claims.

What is claimed is:

1. A lid-mounted monitor comprising:
   a touch panel mounted on a screen of a display, for inputting information when touched;
   a lid mountably and dismountably disposed on a surface of said touch panel, said lid including a small window formed therein, by way of which the screen of said display can be partially seen while said lid is mounted on the surface of said touch panel, and an operation unit by way of which said touch panel can be touched;
   a detecting unit for determining whether said lid is mounted or dismounted to or from the surface of said touch panel; and
   a control unit for, when said detecting unit determines that said lid is dismounted from the surface of said touch panel, displaying information on the entire screen of said display and accepting information corresponding to positions where said touch panel can be touched, and for, when said detecting unit determines that said lid is mounted to the surface of said touch panel, displaying information on a part of the screen of said display corresponding to said small window and accepting information corresponding to positions where said touch panel can be touched;
   wherein said lid can be selectively replaced by a different type of lid provided with a small window and an operation unit, at least either the small window or the operation unit of said lid differs from a corresponding one of these of said different types of lid; and
   said detecting unit detects a type of a lid currently mounted to said lid-mounted monitor, and said control unit changes both information displayed on a part of the screen of said display corresponding to said small window and information associated with the positions where said touch panel can be touched by way of said operation unit according to the type of said lid detected by said detecting unit.

2. The lid-mounted monitor according to claim 1, further comprising a driving mechanism for automatically mounting or dismounting said lid to or from the surface of said touch panel according to an instruction provided by said control unit.

3. A lid-mounted monitor comprising:
   a touch panel mounted on a screen of a display, for inputting information when touched;
   a lid mountably and dismounted disposed on a surface of said touch panel, said lid including a small window formed therein, by way of which the screen of said display can be partially seen while said lid is mounted on the surface of said touch panel, and an operation unit by way of which said touch panel can be touched;
   a detecting unit for determining whether said lid is mounted or dismounted to or from the surface of said touch panel; and
   a control unit for, when said detecting unit determines that said lid is dismounted from the surface of said touch panel, displaying information on the entire screen of said display and accepting information corresponding to positions where said touch panel can be touched, and for, when said detecting unit determines that said lid is mounted to the surface of said touch panel, displaying information on a part of the screen of said display corresponding to said small window and accepting information corresponding to positions where said touch panel can be touched;
   wherein said operation unit disposed in said lid includes a plurality of operation buttons which can come into contact with said touch panel when pushed down; and
   wherein when said detecting unit determines that said lid is mounted to the surface of said touch panel, said control unit increases luminance of parts of the screen of said display that face the plurality of operation buttons, respectively, so as to cause the parts to serve as a backlight.

4. A lid-mounted monitor comprising:
   a touch panel mounted on a screen of a display, for inputting information when touched;
   a lid mountably and dismountably disposed on a surface of said touch panel, said lid including a small window formed therein, by way of which the screen of said display can be partially seen while said lid is mounted on the surface of said touch panel, and an operation unit by way of which said touch panel can be touched;
   a detecting unit for determining whether said lid is mounted or dismounted to or from the surface of said touch panel; and
   a control unit for, when said detecting unit determines that said lid is dismounted from the surface of said touch panel, displaying information on the entire screen of said display and accepting information corresponding to positions where said touch panel can be touched, and for, when said detecting unit determines that said lid is mounted to the surface of said touch panel, displaying information on a part of the screen of said display corresponding to said small window and accepting information corresponding to positions where said touch panel can be touched;

wherein said operation unit disposed in said lid includes a plurality of openings which allow users to touch said touch panel; and wherein when said detecting unit determines that said lid is mounted to the surface of said touch panel, said control unit causes said display to display a function name on a part of the screen thereof which corresponds to each of the plurality of openings.

5. A lid-mounted monitor comprising:

a touch panel mounted on a screen of a display, for inputting information when touched;

a lid mountably and dismountably disposed on a surface of said touch panel, said lid including a small window formed therein, by way of which the screen of said display can be partially seen while said lid is mounted on the surface of said touch panel, and an operation unit by way of which said touch panel can be touched;

a detecting unit for determining whether said lid is mounted or dismounted to or from the surface of said touch panel; and a control unit for, when said detecting unit determines that said lid is dismounted from the surface of said touch panel, displaying information on the entire screen of said display and accepting information corresponding to positions where said touch panel can be touched, and for, when said detecting unit determines that said lid is mounted to the surface of said touch panel, displaying information on a part of the screen of said display corresponding to said small window and accepting information corresponding to positions where said touch panel can be touched; and wherein said operation unit disposed in said lid includes either a plurality of operation buttons or a plurality of openings, and said plurality of operation buttons or openings are so arranged that each of them is not placed at a position corresponding to a position of said touch panel that can be assumed to be pushed down when two or more positions of said touch panel are simultaneously pushed down.

6. A lid-mounted monitor comprising:

a touch panel mounted on a screen of a display, for inputting information when touched;

a lid mountably and dismountably disposed on a surface of said touch panel, said lid including a small window formed therein, by way of which the screen of said display can be partially seen while said lid is mounted on the surface of said touch panel, and an operation unit by way of which said touch panel can be touched;

a detecting unit for determining whether said lid is mounted or dismounted to or from the surface of said touch panel;

a control unit for, when said detecting unit determines that said lid is dismounted from the surface of said touch panel, displaying information on the entire screen of said display and accepting information corresponding to positions where said touch panel can be touched, and for, when said detecting unit determines that said lid is mounted to the surface of said touch panel, displaying information on a part of the screen of said display corresponding to said small window and accepting information corresponding to positions where said touch panel can be touched; and a sensor for detecting a surrounding condition of said lid-mounted monitor, wherein said control unit instructs said driving mechanism to mount or dismount said lid to or from the surface of said touch panel according to the surrounding condition detected by said sensor.

* * * * *